US012654959B2

(12) United States Patent (10) Patent No.: US 12,654,959 B2

Hausecker et al. (45) Date of Patent: Jun. 16, 2026

(54) CONTAINER LIFTING AND EMPTYING DEVICE

(71) Applicant: Schaeffler Technologies AG & Co. KG, Herzogenaurach (DE)

(72) Inventors: Jörg Hausecker, Herzogenaurach (DE); Thomas Kurz, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 344 days.

(21) Appl. No.: 18/282,283

(22) PCT Filed: Mar. 9, 2022

(86) PCT No.: PCT/DE2022/100190

§ 371 (c)(1),
(2) Date: Sep. 15, 2023

(87) PCT Pub. No.: WO2022/199750

PCT Pub. Date: Sep. 29, 2022

(65) Prior Publication Data

US 2024/0158188 A1 May 16, 2024

(30) Foreign Application Priority Data

Mar. 23, 2021 (DE) .......................... 102021107127.5

(51) Int. Cl.
B65G 65/23 (2006.01)

(52) U.S. Cl.
CPC .................................. B65G 65/23 (2013.01)

(58) Field of Classification Search
CPC .................................................... B65G 65/23
See application file for complete search history.

(56) References Cited

U.S. PATENT DOCUMENTS

| | | | | | |
|---|---|---|---|---|---|
| 3,279,635 | A | * | 10/1966 | Avery | B65G 65/23 |
| | | | | | 414/420 |
| 4,422,814 | A | * | 12/1983 | Borders | B65F 3/043 |
| | | | | | 414/303 |
| 4,597,710 | A | * | 7/1986 | Kovats | B65F 3/08 |
| | | | | | 414/673 |
| 5,308,211 | A | * | 5/1994 | Bayne | B65F 3/08 |
| | | | | | 414/408 |
| 5,772,385 | A | * | 6/1998 | Huntoon | B65F 3/043 |
| | | | | | 414/420 |
| 5,895,196 | A | * | 4/1999 | Forsyth | B65G 65/23 |
| | | | | | 414/421 |
| 9,004,084 | B2 | * | 4/2015 | Lim | B08B 3/00 |
| | | | | | 134/155 |

(Continued)

FOREIGN PATENT DOCUMENTS

| | | |
|---|---|---|
| CH | 556786 A | 12/1974 |
| CN | 107416540 A | 12/2017 |
| CN | 109879072 A | 6/2019 |

(Continued)

*Primary Examiner* — Jonathan Snelting
(74) *Attorney, Agent, or Firm* — Volpe Koenig

(57) ABSTRACT

A container lifting and emptying device (1), including a movable frame (2), a slide (18) which can be moved on the frame (2) in a vertical direction, and a container pivoting device (19) which is mounted on the slide (18) and which is designed to grip a container (8) located on a container stack (6, 7) from above via multiple latches (24, 25).

17 Claims, 9 Drawing Sheets

(56) References Cited

U.S. PATENT DOCUMENTS

| | | | |
|---|---|---|---|
| 11,104,527 B1 * | 8/2021 | Zhao .................... | B65G 47/905 |
| 2014/0138213 A1 * | 5/2014 | Magni ................... | B65G 17/12 |
| | | | 198/464.1 |

FOREIGN PATENT DOCUMENTS

| | | | |
|---|---|---|---|
| CN | 110857187 | A | 3/2020 |
| CN | 111498450 | A | 8/2020 |
| CN | 111792395 | A | 10/2020 |
| DE | 8810211 | | 11/1988 |
| DE | 4328378 | | 3/1994 |
| DE | 202008016092 | | 3/2009 |
| DE | 102013002752 | | 8/2014 |
| DE | 202017000025 | | 3/2017 |
| DE | 102016109017 | | 11/2017 |
| FR | 3097539 | | 12/2000 |
| JP | 2012096910 | | 5/2012 |
| NL | 7701966 | | 8/1978 |
| NL | 9101271 | | 2/1993 |

* cited by examiner

CONTAINER LIFTING AND EMPTYING DEVICE

CROSS-REFERENCE TO RELATED APPLICATIONS

This application is the U.S. National Phase of PCT Appln. No. PCT/DE2022/100190, filed Mar. 9, 2022, which claims priority from German Patent Application No. 10 2021 107 127.5, filed Mar. 23, 2021, the entire disclosures of which are incorporated by reference herein.

TECHNICAL FIELD

The disclosure relates to a container lifting and emptying device.

BACKGROUND

A generic lifting and emptying device for containers is known, for example, from DE 88 10 211 U1. The known container lifting and emptying device comprises a frame movable on wheels, a slide which can be moved on the frame in a vertical direction, and a motor that causes the slide to move vertically. Furthermore, in the case of the lifting and emptying device according to DE 88 10 211 U1, a pivoting frame is provided to which a container can be attached. Further, the known lifting and emptying device comprises a rack which can be attached to the frame at different heights. A gear is mounted on the slide, which meshes with the rack. The rotary movement of the gear is converted into a pivoting movement of the pivoting frame.

Different crate lifting devices are described, for example, in the publications DE 20 2008 016 092 U1 and DE 10 2013 002 752 A1. A crate stacking system is disclosed in DE 10 2016 109 017 A1.

DE 43 28 378 C2 describes a lifting and emptying device for a waste collection container. On the lifting and emptying device there are two gripping devices for hooking in suspension brackets of a collection container. The two gripping devices can be operated either together or separately from one another.

SUMMARY

The disclosure is based on the object of specifying a container lifting and emptying device which has been further developed compared to the prior art, can be used flexibly and is particularly user-friendly.

This object is achieved according to the disclosure by a device designed for lifting and emptying containers having one or more of the features disclosed herein. The container lifting and emptying device comprises a movable frame, a slide which can be moved on the frame in a vertical direction, and a container pivoting device which is mounted on the slide and which is designed to grip a container located on a container stack from above by means of multiple latches.

One advantage over conventional solutions, in which a container is lifted from below with a fork, is that containers can be removed one after the other from the top of a stack in a simple manner and pivoted in the course of further handling. The pivoting movement can be a complete pivoting, i.e., a 180° pivoting movement. Likewise, variants are possible in which pivoting through a smaller angle, for example only 135°, is provided.

Irrespective of the maximum pivoting angle, at least two latches are arranged on opposite container sides in each case, for example, which latches are designed for automatic engagement in a contour of a container when the container pivoting device is lowered. Depending on the design of the containers to be handled, a single latch per container side on which the container is to be gripped may be sufficient in extreme cases. Likewise, designs are conceivable in which a container is gripped with the aid of more than two latches per container side.

According to an advantageous further development, latches are provided for different container types, wherein all latches are preloaded by spring force and can be deactivated by means of latching bolts. Instead of latching bolts, other mechanisms that disable the latches that are not needed can also be considered. In any case, the container lifting and emptying device can thus be converted to different container types in the simplest way and in a short amount of time.

Regardless of the number and arrangement of the latches, the latches, in the engaged state, can be designed to allow displacement of the latched container in a plane parallel to the container bottom. Thus, a container can be removed manually from the container lifting and emptying device in the simplest way, without operating a release mechanism.

The container pivoting device can comprise a container cover lock, by means of which, in a mechanically positively controlled manner, namely by means of a cam or link control, an unlocking state is set in a storage position as well as in a tilted container position and a locking state is set otherwise. The mechanically controlled container cover lock ensures that the cover of the container remains locked during pivoting and that the parts located in the container can be deposited gently, i.e., in particular with minimal impact, onto a downstream conveying device, in particular in the form of a conveyor belt or a vibratory feeder, during and after the pivoting process, thus avoiding or minimizing surface damage.

The vertically movable slide is driven by a spindle drive, for example. The slide can be, for example, a housing of a transmission of the container pivoting device. A non-pivoting component of the container pivoting device can rest loosely on an output element of the spindle drive, that is, an element connected to the spindle nut. This applies both when lifting and lowering the container. During the lowering process, if the load, i.e., the container pivoting device together with the container, is stopped, the output element of the spindle drive may continue the lowering movement and thus move away from the slide in a downward direction. This process is also referred to as overtaking of the slide by the output element of the spindle drive. During the pivoting of the container, such overtaking should be mechanically excluded.

For this purpose, a locking element can be mounted on the container pivoting device such that it can be moved and which, in a first setting, enables overtaking of the slide by the output element of the spindle drive and at the same time blocks pivoting movements of the container pivoting device, whereas, in a second setting of the locking element, overtaking of the slide by the output element of the spindle drive is blocked and, at the same time, pivoting movements of the container pivoting device are enabled. In this regard, a switchover between the two settings of the locking element can be performed in a mechanically positively controlled manner as a function of the vertical position of the slide.

For the mechanically triggered stopping of the slide in cases where the output element of the spindle drive otherwise supporting the container pivoting device overtakes the slide, i.e., moves downwards away from the slide, a brake can be provided, comprising for example an eccentric as the braking element. In this regard, the eccentric can be provided with a brake lining or act as a whole like a brake lining.

As an alternative to a spindle drive as an electromechanical linear drive, a traction means in the form of a toothed belt or a chain can be provided which, typically also in an electrically driven manner, lifts the container pivoting device. Irrespective of how the container pivoting device is lifted and lowered, the pivoting can be mechanically synchronized with the lifting movement by means of a transmission. Elements of this transmission can, in this regard, be integrated into the mechanism that moves the locking element already described. This applies in particular to embodiments in which the transmission designed for pivoting the container comprises a rack. In this case, the mechanism that moves the locking element can comprise a control roller that runs against the rack. A spindle drive can be provided for lifting and lowering the container, as in other embodiments.

The movable frame of the container lifting and emptying device has, for example, a U-shape in a top view, which makes it possible to grip around a single container stack or even two container stacks located next to one another. The containers to be lifted and pivoted are thus located within a rectangle described by the movable frame. In the case of two container stacks arranged next to one another, the relative positioning of the movable frame and containers must be changed after the first stack has been processed in order to enable the handling of the second container stack.\

In general, the container lifting and emptying device can either be designed to be movable on rollers or designed for longer-term use in one and the same place. The stacked containers can be located on a pallet in the form of a single stack, into which a drip tray can be integrated if required. The same applies to a floor roller that carries one or more container stacks. The container lifting and emptying device is fully functional without pneumatic or hydraulic drives.

The speed at which the containers are lifted can be adjustable. An automatic reduction of the vertical movement speed can be provided within the pivoting range. Limit switches can be provided to stop the movements performed by the container lifting and emptying device. The container lifting and emptying device is typically designed for container weights of up to 50 kg. Scaling is possible while retaining the basic design features.

BRIEF DESCRIPTION OF THE DRAWINGS

Several exemplary embodiments according to the disclosure are explained in more detail below with reference to a drawing. In the figures.

DETAILED DESCRIPTION

Figures 1, 2, 3:
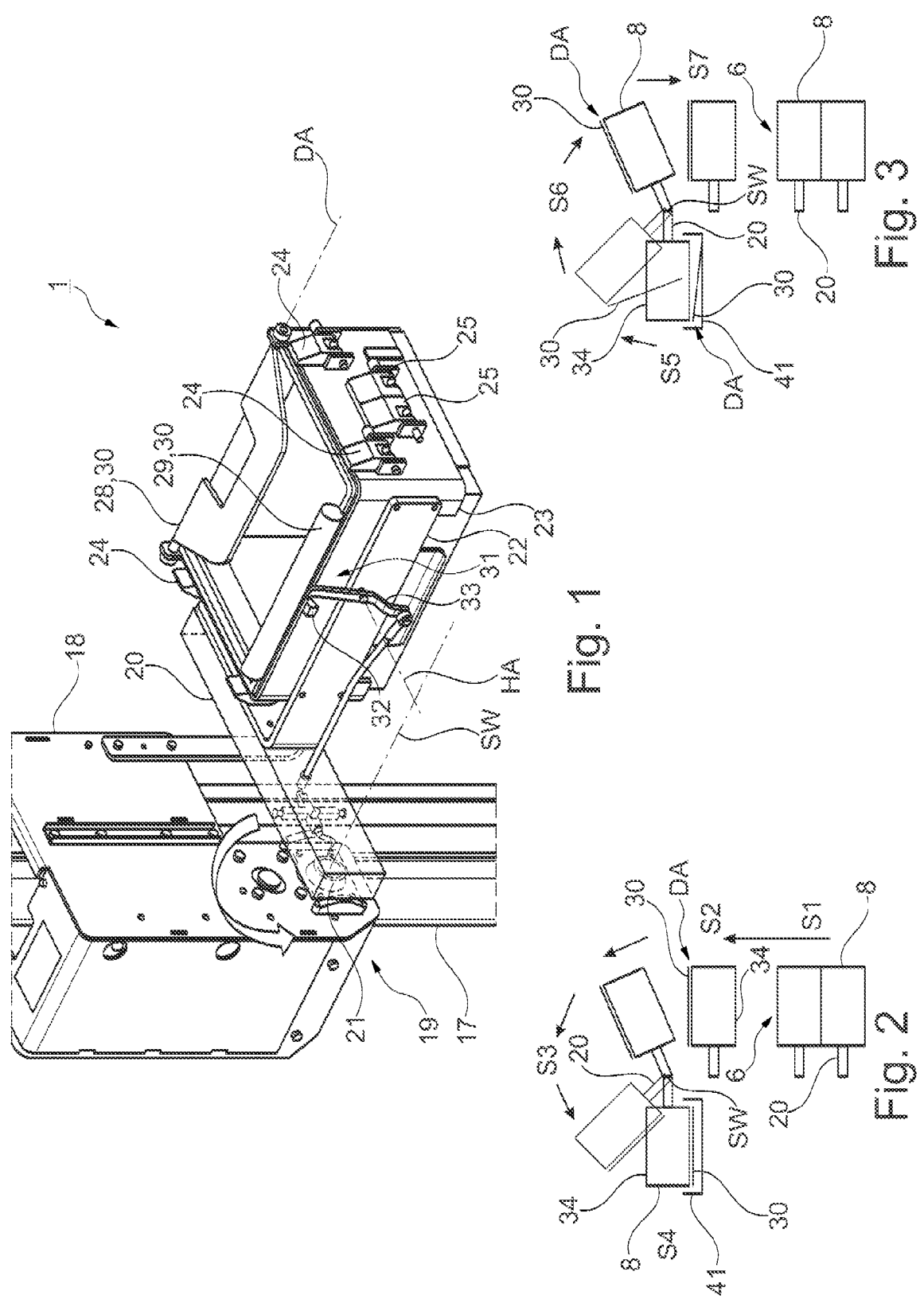
FIG. 1 shows a section of a container lifting and emptying device in a perspective view.
FIG. 2 shows a schematic representation of a lifting and pivoting process that can be carried out with the device according to FIG. 1.
FIG. 3 shows a pivoting and lowering process in a representation analogous to FIG. 2.

Unless otherwise stated, the following explanations relate to both exemplary embodiments. Parts that correspond to each other or have basically the same effect are marked with the same reference symbols in all figures.

A container lifting and emptying device designated overall with the reference symbol 1 comprises a movable frame 2, on which wheels 3 are located. The frame 2 describes a U-shape, which is formed by a metal plate 13, which is the main element of the frame 2. A recess formed by the U-shape of the frame 2 is designated with 11 and is dimensioned such that a roller designated with 4, on which two stacks 6, 7 of containers 8 are located, can be positioned in the recess 11. In deviation from the exemplary embodiment sketched in FIG. 15, the roller 4 could also be designed to receive only a single container stack 6. The wheels of the roller 4 are designated with 5.

Figure 15:
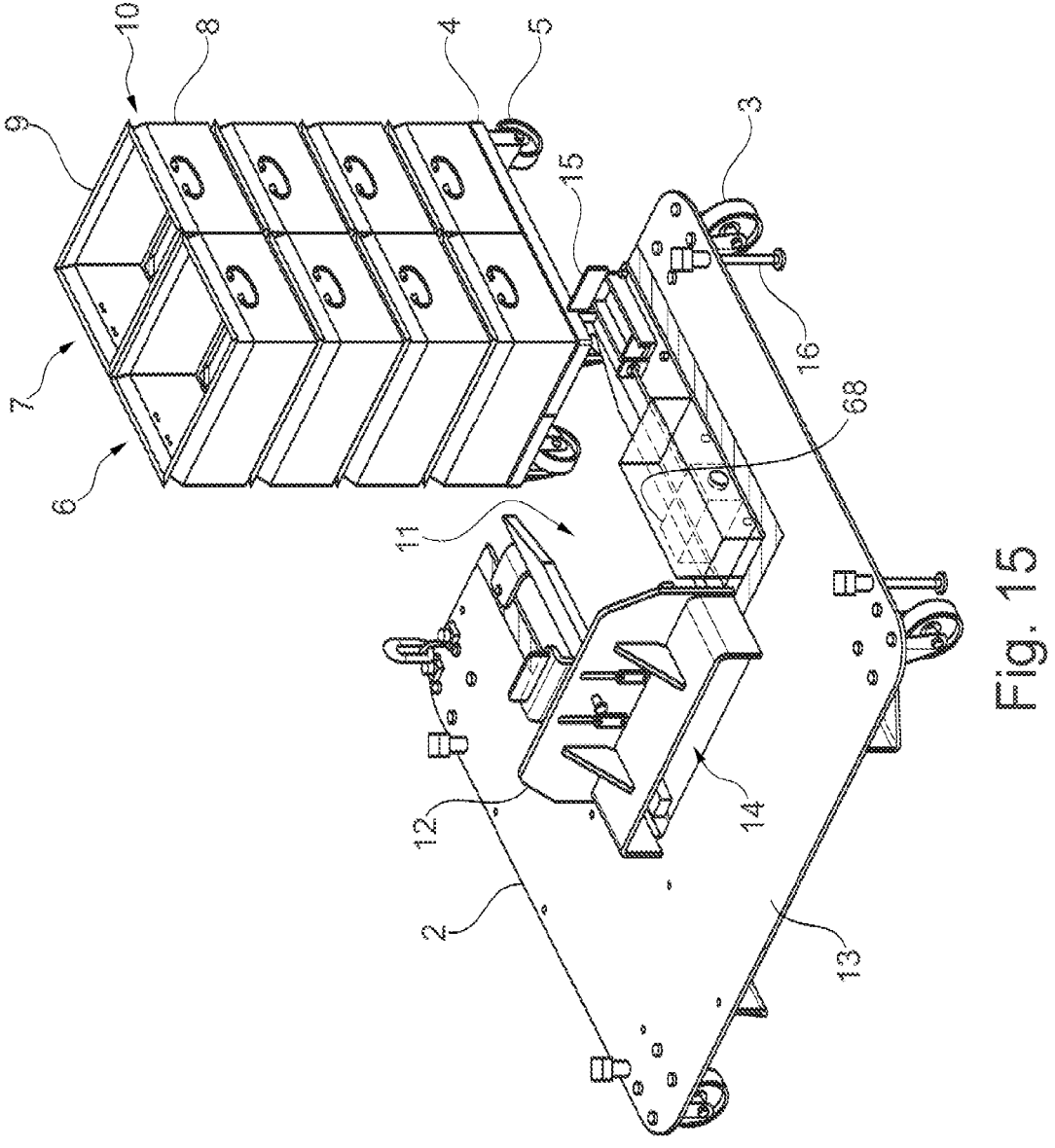
FIG. 15 shows movable components of the container lifting and emptying device according to FIG. 1 and a container arrangement.

The roller 4 with the container stacks 6, 7 is pushed into the recess 11 until the container stacks 6, 7 are stopped by a height-adjustable container stop 12. Below the container stop 12 and above the metal plate 13, a tunnel 14 is formed in the exemplary embodiment according to FIG. 15. The tunnel 14 allows a transport and storage device in which workpieces are located, in particular a floor roller, to be partially advanced beyond the container stop 12. The ability to adjust the height of the container stop 12 is particularly useful when using containers 8 stacked on pallets. The container stop 12 ensures that the container stack 6, which has considerable inertia, does not slip when stopped in the recess 11, which would otherwise be possible due to the low friction between the containers 8 and the pallet or roller 4. FIG. 15 also shows a foot-operated actuator 15, which is located on the metal plate 13 and is provided for actuating a lateral stop 68. The stop 68, with which the roller 4 together with the container stacks 6, 7 can be stopped, is designed for masses of up to 300 kg in the exemplary embodiment. The entire frame 2 can be fixed in position by means of supports 16.

A vertically oriented guide assembly 17, which can be seen in FIG. 1, among others, is mounted on the movable frame 2. A slide 18 can be moved on the guide assembly 17, on which a container pivoting device 19 is located. The container pivoting device 19 comprises a pivot arm 20, which is horizontally oriented in the arrangement according to FIG. 1. This orientation corresponds to a step S1 of a lifting and pivoting process, which is symbolized in FIG. 2. The container 8, which has already been lifted from the stack 6 in step S2 but is still in a horizontal position, is pivoted 180° about a pivot axis SW in step S3. In the last step according to FIG. 2, designated with S4, the container 8 is located directly above a conveying device 41, in this case a conveyor belt, wherein a cover of the container 8, designated with 30, is arranged at a small distance above the conveying device 41. During the pivoting movement, the cover 30 is fixed on the container 8, as will be explained in more detail below.

In the tilted state, the cover 30, whose pivot axis on the container 8 is designated with DA and is always arranged parallel to the pivot axis SW of the pivot arm 20 during the entire pivoting process, opens slightly until it rests on the conveying device 41. This state is designated with S5 in FIG. 3, which illustrates the emptying and pivoting back of the container 8. The slight opening of the cover 30 when completely tipped over is due to its own weight as well as the weight of the workpieces to be conveyed and located in the container 8. As the container 8 is pivoted back, designated with S6 in FIG. 3, the cover 30 initially opens further so that the workpieces slide gently onto the conveying device 41. The gentle deposition of the workpieces on the conveying device 41 is supported by a cover lock 31, which is actuated by means of a cam control 50, which will be discussed in more detail below. Furthermore, a light curtain avoids damage that would be conceivable due to a repeated movement to the emptying position of the conveying device 41, i.e., of the metering belt or linear conveyor. In general, the light curtain monitors the plant area to ensure that the operation of the container lifting and emptying device 1 is not disturbed by parts or bulk material.

After passing the vertical orientation during the pivoting back of the empty container 8, the cover 30 is closed again, as indicated in step S7 according to FIG. 3. Subsequently, it is possible to remove the container 8, to stack the containers 8 again or to transport the containers 8 further as desired.

Figure 12:
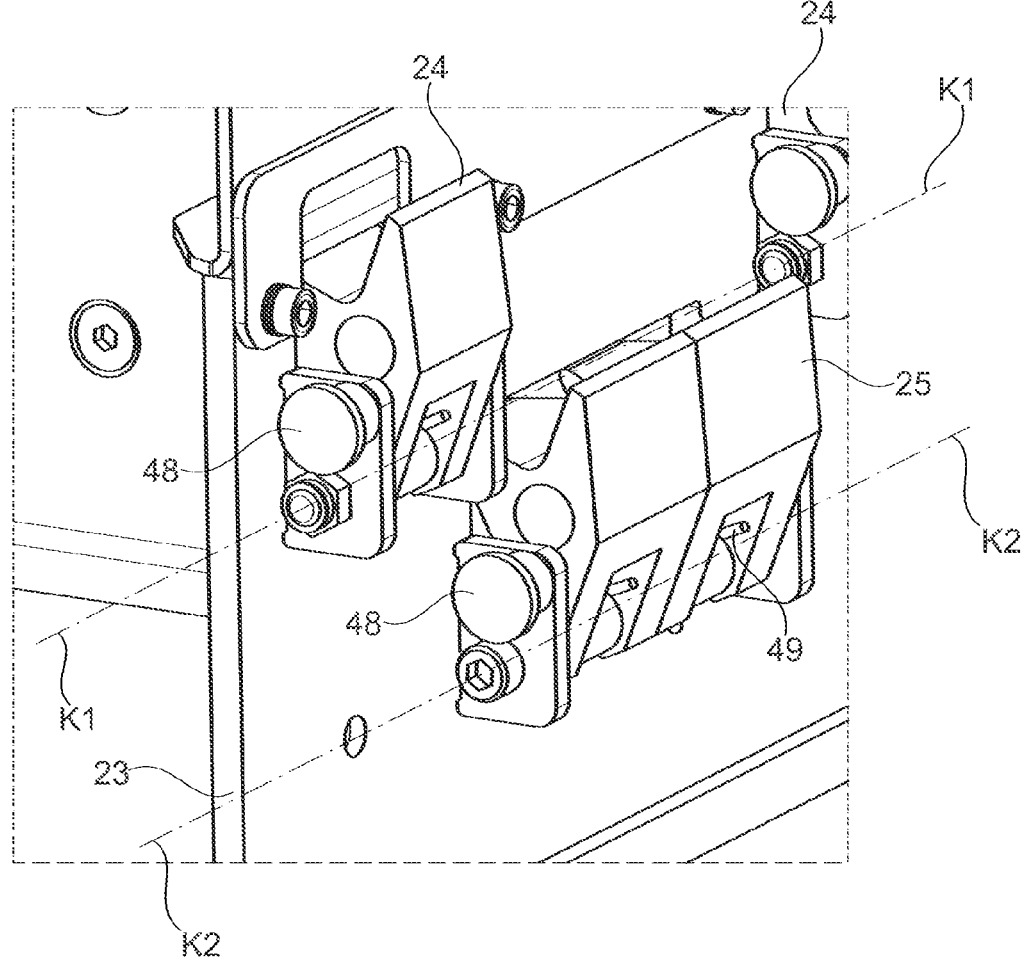
FIG. 12 shows a detail of a latch mechanism, which is used in the device according to FIG. 1 as well as in the device according to FIG. 9.

Details of the pivoting device 19 are shown in FIG. 1. A rotationally symmetrical component 21 is arranged concentrically to the pivot axis SW. An L-shaped connecting element 22 is held on the pivot arm 20, which supports a holding frame 23. The dimensions of the holding frame 23 are adapted to the size of a container 8. Two latches 24 each and two further latches 25 are mounted on two opposite sides of the holding frame 23. In the exemplary embodiment shown in FIG. 1, the latches 24 are located near the top edge of the holding frame 23 near the corners of the container 8. In each case, two latches 25 arranged directly next to one another are located approximately in the middle of a narrow side of the container 8, i.e., in an arrangement offset towards the container bottom 34 compared to the latches 24. The purpose of the different arrangement of the latches 24 on the one hand and the latches 25 on the other hand is to be able to grip different containers 8 if required. The contours of the container 8 in which latches 24, 25 can grip are designated with 10. Details of the mechanism for gripping the container 8 implemented by means of the latches 24, 25 are shown in FIG. 12. Accordingly, latches 24, 25 that are not required can be locked by means of bolts 48. A torque is applied to each latch 24, 25 by a spring 49. The axes about which the latches 24, 25 can be tilted are designated with K1, K2.

Regardless of the individual design of the containers 8, they can be easily picked up by the container lifting and emptying device 1 by moving the holding frame 23 together with the latches 24, 25 over the container 8 from above. In the exemplary embodiment shown in FIG. 1, a spindle drive 26 is provided for moving the slide 18 in the vertical direction as required for this purpose. The transmission of the container pivoting device 19 is designated with 27.

In the exemplary embodiments, the cover 30 of the container 8 is of multi-part construction, wherein a cover part 28 is mounted so as to be tiltable about the cover axis DA. At the edge of the cover 30 opposite the cover axis DA, the cover has a cover part 29 which is bead-shaped to allow for easier manual lifting and to be able to provide a damping effect.

Figure 14:
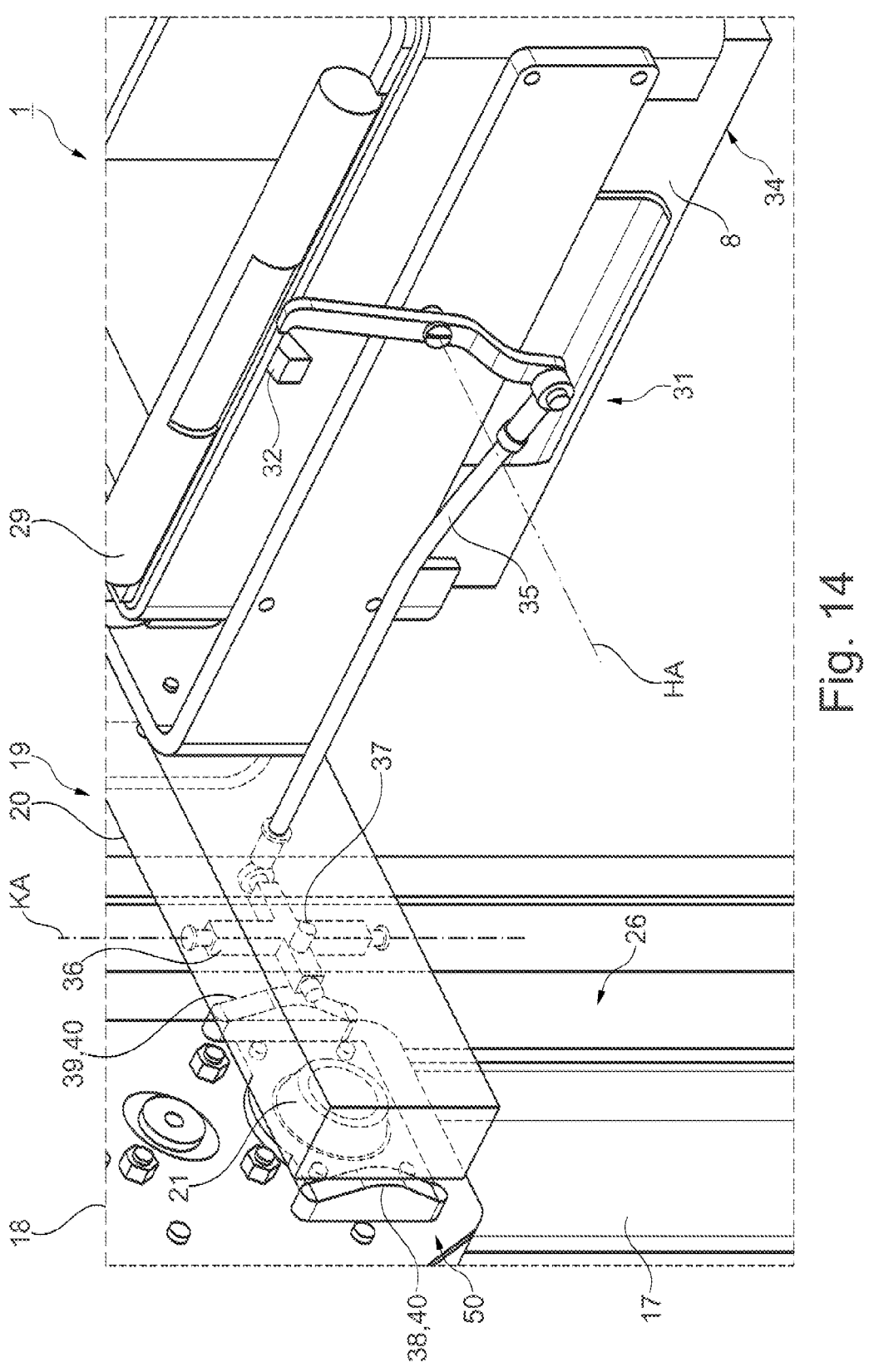
FIG. 14 shows a cover lock of the container lifting and emptying device according to FIG. 1.

Components of the cover lock 31 can be seen in both FIG. 1 and FIG. 14. In the arrangement shown in FIG. 1 and FIG. 14, a pin 32 associated with the cover 30 is fixed by a lever 33 of the cover lock 31. The two-armed lever 33 can be pivoted about a lever axis HA, which is arranged parallel to the pivot arm 20 and intersects the pivot axis SW at least approximately. The two axes SW and HA thus form a plane which is arranged parallel to the container bottom 34. The end of the lever 33 facing away from the pin 32 is coupled to an actuation rod 35, which in turn is coupled to a tilt star 36. The tilt axis of the tilt star 36 is designated with KA and is arranged vertically when the container 8 is in a horizontal position. The tilt axis KA pivots with the pivot arm 20, as does the lever axis HA. A spring loading the tilt star 36 is designated with 37. The tilt star 36 interacts directly with a cam component 40 which comprises two similar cams 38, 39. The cams 38, 39 are designed in such a way that the cover 30 is positively locked during pivoting and can only be opened in its initial position and in the 180° tilted position. The cam component 40 is part of the cam control designated as a whole with 50.

Figure 4:
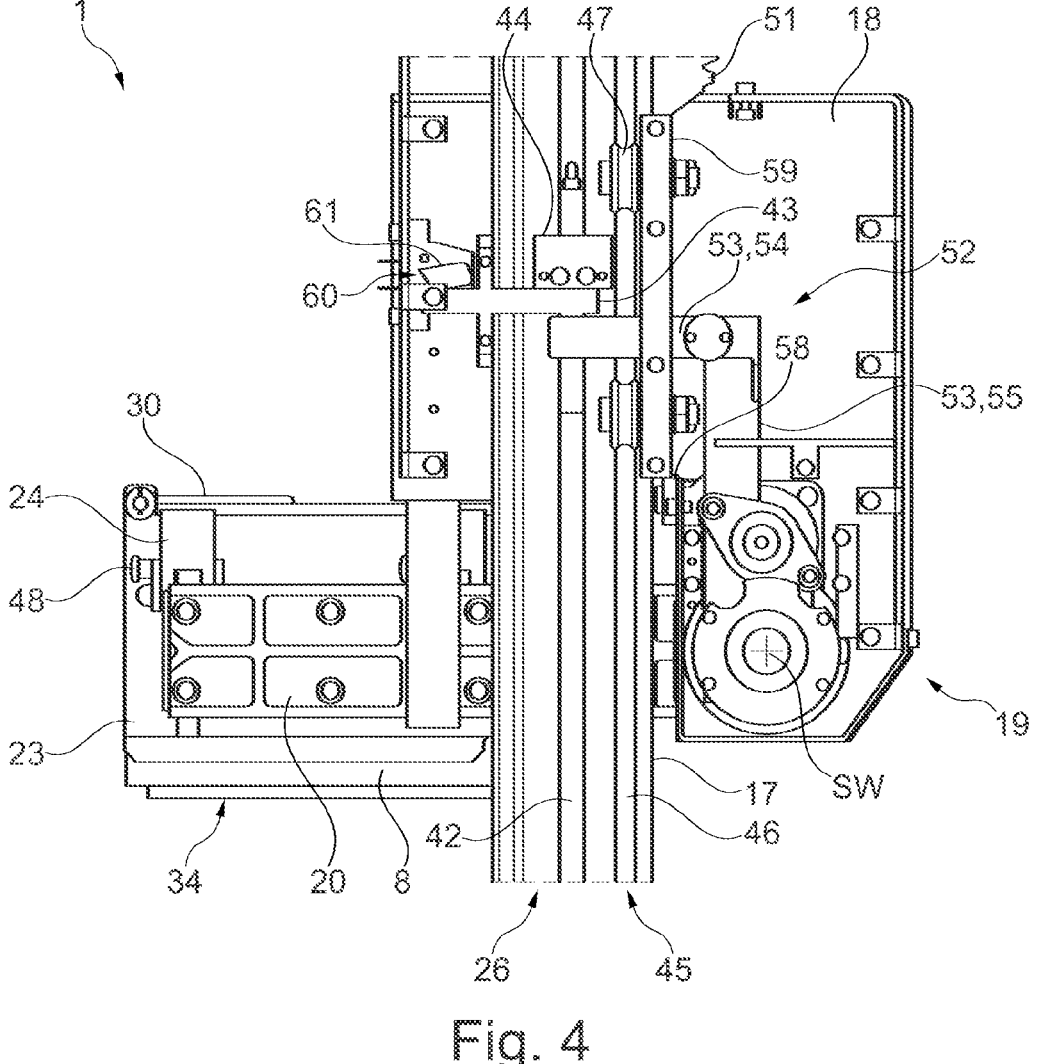
FIG. 4 shows a rear view of the device according to FIG. 1.

In the rear view according to FIG. 4, a lifting spindle 42 is indicated which, as part of a screw drive, enables the slide 18 to be lifted and lowered. A nut-side component 43 of the spindle drive is coupled to its spindle nut. On the nut-side component 43, which has a cross shape in the view according to FIG. 4, a carrier 44 rests, which is fixedly connected to the slide 18. A track roller guide 45 is provided for linear guidance of the entire container pivoting device 19, which comprises a rail 46 and track rollers 47. The track rollers 47 are attached to strips 59, which are fixedly connected to the slide 18.

Figure 8:
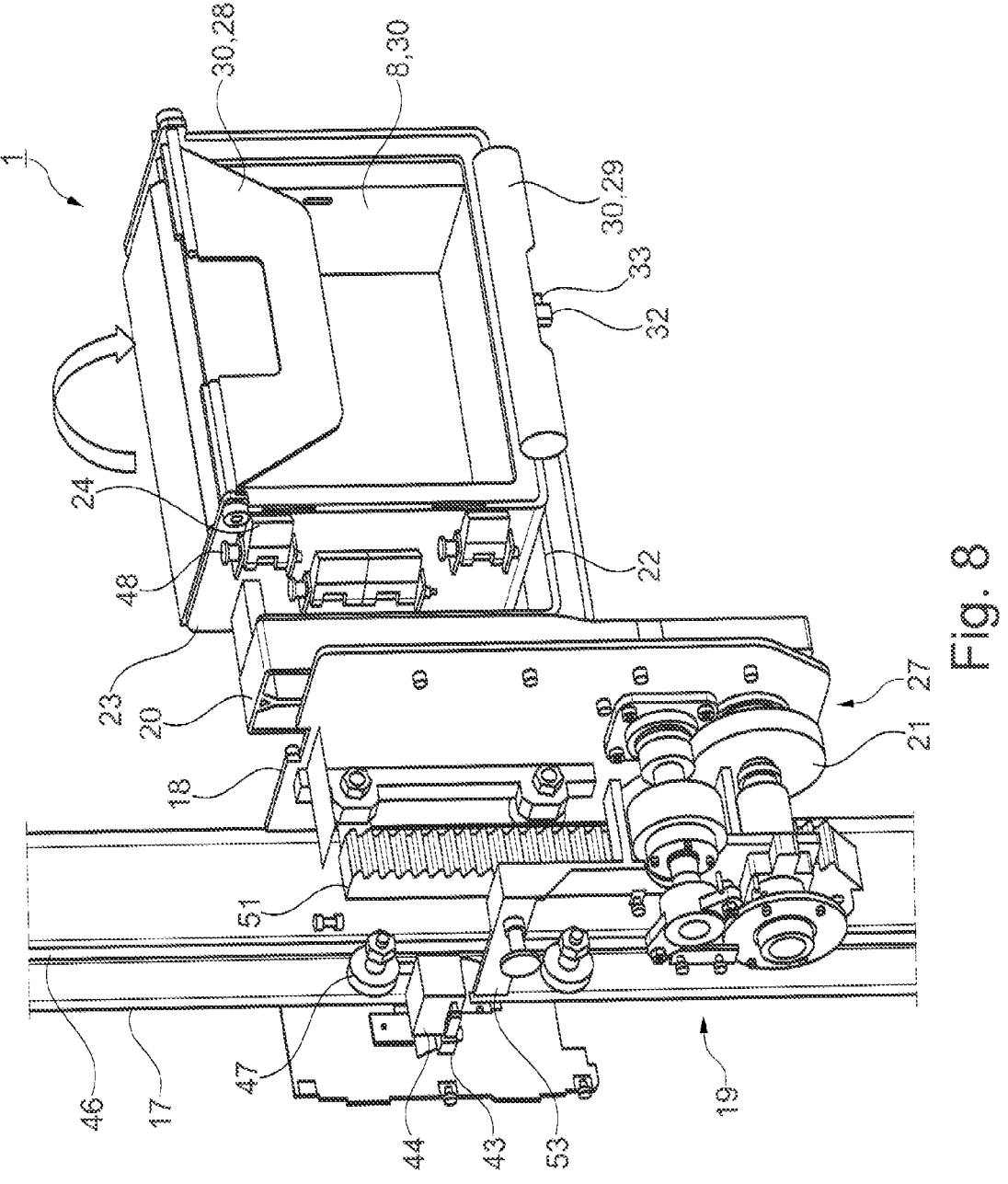
FIG. 8 shows a container pivoting device of the container lifting and emptying device according to FIG. 1.

In FIGS. 4 and 8, a rack 51 can be seen, which can be attributed to the guide assembly 17. The rack 51 is a component of the transmission 27 of the container pivoting device 19. As soon as the container 8 is lifted far enough, a gear engages with the rack 51 and initiates the pivoting of the arm 20. At the same time, the movement speed of the slide 18 is automatically reduced. In addition to this function as part of the pivoting process, the rack 51 has a function as a component of a locking and release device 52. The locking and release device 52 is associated with a two-armed locking lever 53, the arms of which, arranged at right angles to one another, are designated with 54, 55. The locking lever 53 can be displaced slightly in the direction of the pivot axis SW, i.e., perpendicular to the image plane with respect to the arrangement shown in FIG. 4. The displacement is forced by a control roller 58, which runs against the rack 51.

Figures 5, 6, 7:
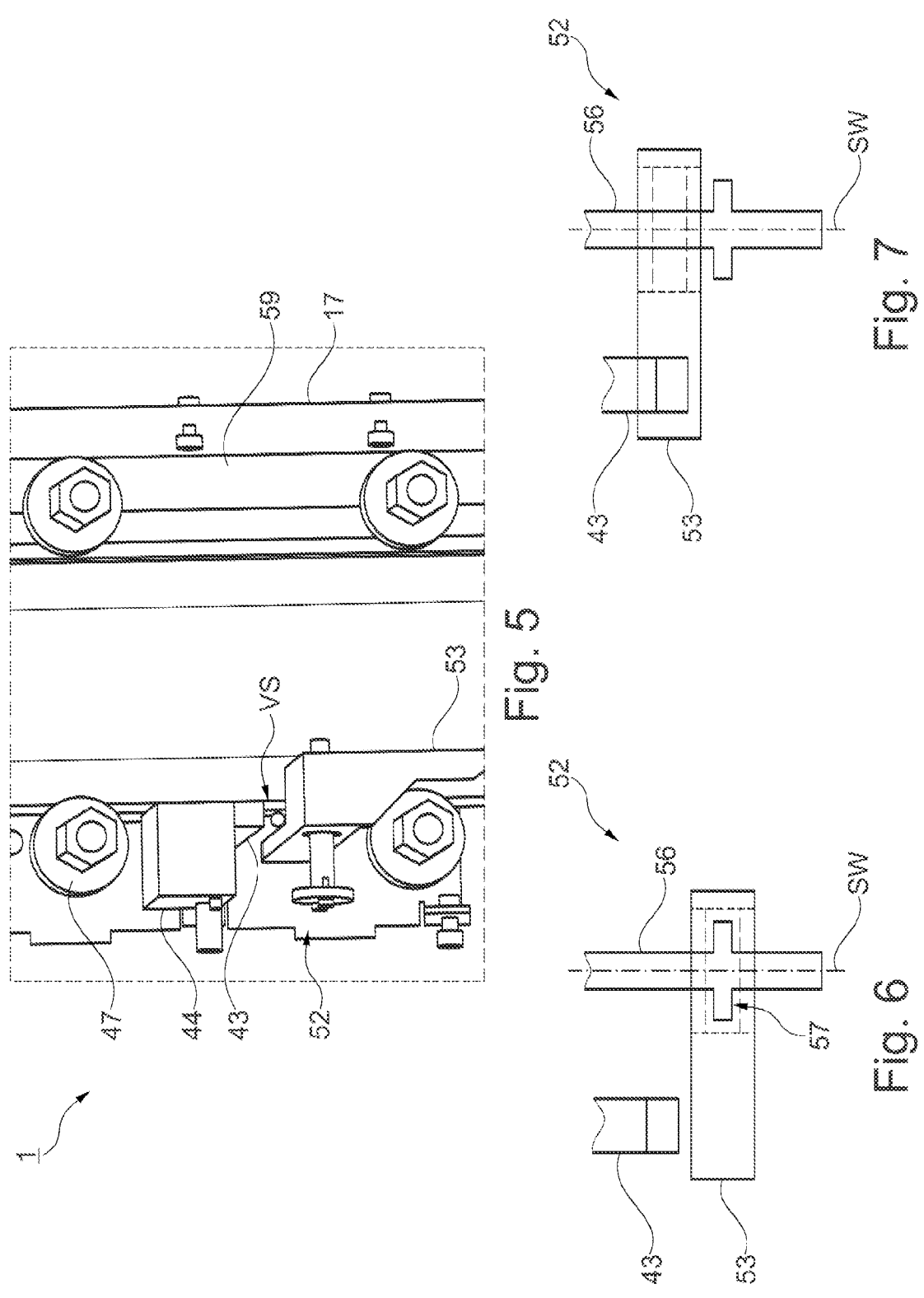
FIG. 5 shows a detail of the container lifting and emptying device according to FIG. 1, including a locking element which can be moved.
FIGS. 6 and 7 show schematic representations of various possible settings of the locking element.

If the slide 18 is outside the pivoting range, which means that the control roller 58 is not in contact with the rack 51, the state shown in FIG. 5 is set. In this case, there is an offset VS in the direction of the pivot axis SW between the arm 54 and the nut-side component 43, which ensures that the spindle nut together with the nut-side component 43 could move downwards away from the carrier 44, which is also referred to as overtaking of the slide 18. The corresponding state is symbolized in FIG. 6. In this state, a shaft 56, which is fixedly connected to the pivot arm 20, interacts with the locking lever 53 in the sense of an activated anti-rotation device 57. This means that the arm 20 cannot be pivoted.

If, on the other hand, the locking lever 53 is displaced by the control roller 58 running against the rack 51, which occurs within the pivoting range, the result is the state sketched in FIG. 7. Here, the nut-side component 43 is blocked by the locking lever 53, while at the same time the pivoting movement of the arm 20 is enabled. The tipping point of the load, i.e., of the container 8, corresponding to a vertical orientation of the pivot arm 20, is reached in the arrangement shown in FIG. 8. In this state and when the container 8 is tipped further, the locking lever 53 can also serve to provide torque support.

Figure 13:
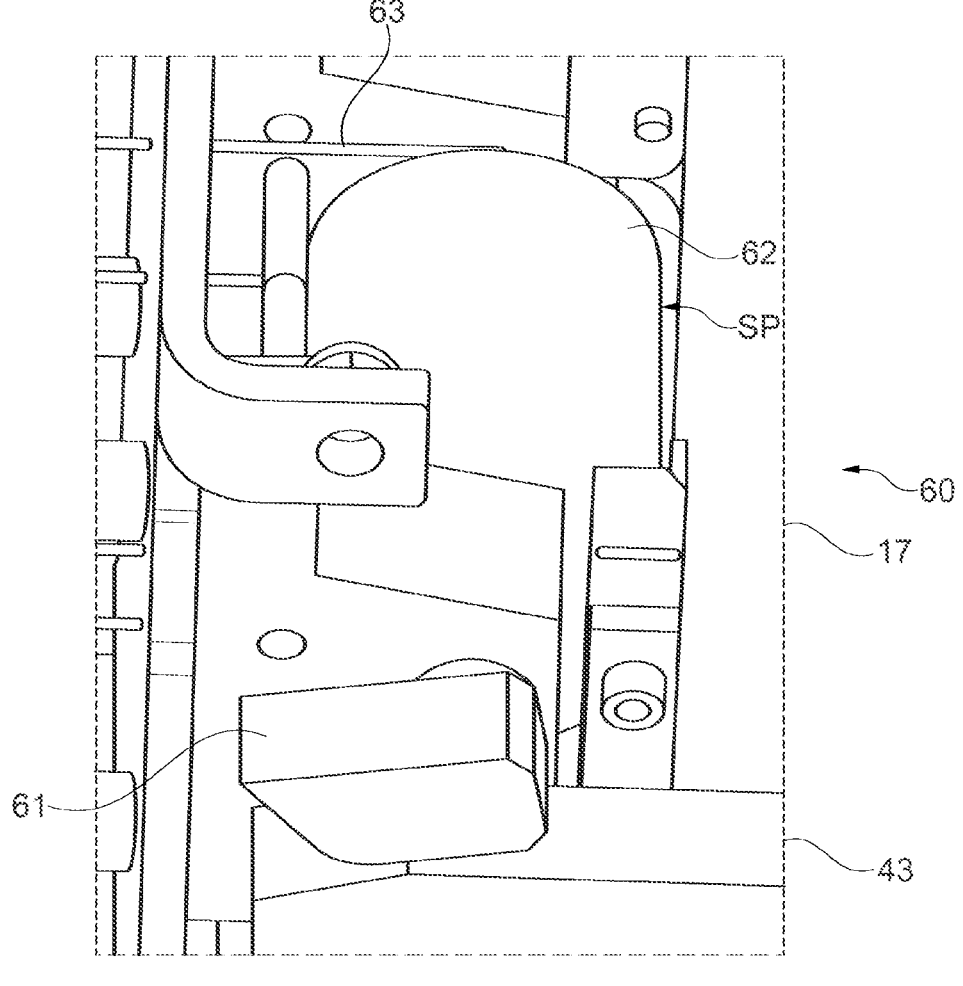
FIG. 13 shows a brake of the container lifting and emptying device according to FIG. 1.

Details of a brake 60 of the container lifting and emptying device 1 according to FIG. 1 are shown in FIG. 13. An actuation lever 61 interacts directly with the nut-side component 43. When the nut-side component 43 moves away from the actuation lever 61, the latter rotates an eccentric roller 62 in such a way that it closes a gap SP and comes into contact with the guide assembly 17. A spring that preloads the brake 60 is designated with 63.

Figures 9, 10, 11:
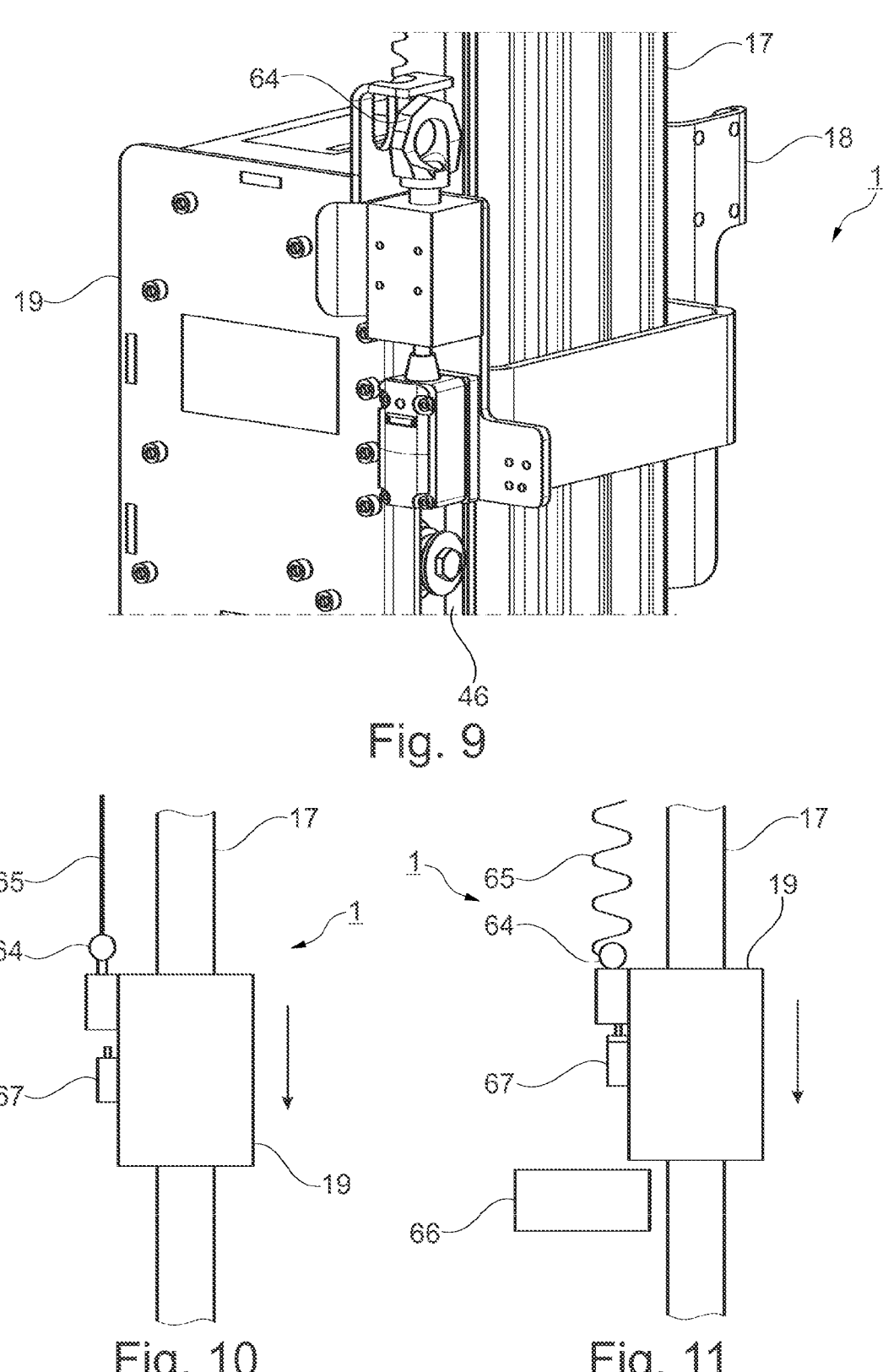
FIG. 9 shows an alternative design of a container pivoting device.
FIGS. 10 and 11 show schematic representations of various states of a slack chain monitoring system of the arrangement shown in FIG. 9.

In the exemplary embodiment according to FIGS. 9 to 11, the slide 18 is not lifted and lowered by a spindle drive, but by a chain 65, i.e., a traction means. In this case, a slack chain monitoring is provided. If the container pivoting device 19 encounters an obstacle 66 during lowering so that the chain 65 loses tension, as a comparison of FIGS. 10 and 11 shows in an exaggerated illustration, a switch 67 is triggered by means of which the electrical drive of the chain 65 is stopped. It is also possible to combine the switch 67 with a mechanical brake.

LIST OF REFERENCE SYMBOLS

1 Container lifting and emptying device
2 Frame
3 Wheel
4 Roller
5 Wheel
6 Container stack
7 Container stack
8 Container
9 Container edge
10 Contour of the container
11 Recess
12 Height-adjustable container stop
13 Metal plate
14 Tunnel
15 Foot-operated actuator
16 Support
17 Guide assembly
18 Slide
19 Container pivoting device
20 Pivot arm
21 Rotationally symmetrical component
22 L-shaped connecting element
23 Holding frame
24 Latch
25 Latch
26 Spindle drive
27 Transmission of the pivoting device
28 Cover part
29 Cover part
30 Cover
31 Cover lock
32 Pin on the cover
33 Cover lock lever
34 Container bottom
35 Actuation rod

36 Tilt star
37 Spring
38 Cam component
39 Cam component
40 Cam component
41 Conveying device
42 Lifting spindle
43 Nut-side component
44 Carrier
45 Track roller guide
46 Rail
47 Track roller
48 Bolt
49 Torsion spring
50 Cam control
51 Rack
52 Locking and release device
53 Locking lever
54 Arm
55 Arm
56 Shaft
57 Anti-rotation contour
58 Control roller
59 Strip
60 Brake
61 Actuation lever
62 Eccentric roller
63 Spring
64 Eye
65 Chain
66 Obstacle
67 Switch
68 Lateral stop
DA Cover axis, pivot axis
HA Lever axis
KA Tilt axis
K1 Tilt axis
K2 Tilt axis
S1 . . . S7 Step
SP Gap
SW Pivot axis
VS Offset

The invention claimed is:

1. A container lifting and emptying device, comprising:
a movable frame;
a slide which is movable on the frame in a vertical direction; and
a container pivoting device mounted on the slide, the container pivoting device includes multiple latches that grip a container located on a container stack from above, wherein the latches are provided for different container types, and all of the latches are preloaded by spring force and are deactivatable by latching bolts.

2. The lifting and emptying device according to claim 1, wherein at least two of the latches are arranged on opposite container sides in each case, said latches are designed for automatic engagement in a contour of the container upon lowering of the container pivoting device.

3. The lifting and emptying device according to claim 1, wherein the latches in an engaged state are designed to allow displacement of the container held by the latches in a plane parallel to a container bottom.

4. The lifting and emptying device according to claim 1, wherein the container pivoting device comprises a container cover lock, by which, in a mechanically positively controlled manner, an unlocking state is set in a storage position as well as in a tilted container position and a locking state is set in other positions.

5. The lifting and emptying device according to claim 1, further comprising a spindle drive for driving the slide.

6. The lifting and emptying device according to claim 1, wherein the slide is driven by an electrically operated traction drive, and a device for monitoring the electrically operated traction drive for tension is coupled to the electrically operated traction drive.

7. The lifting and emptying device according to claim 1, wherein the movable frame is designed for gripping around two container stacks positioned next to one another.

8. A container lifting and emptying device, comprising:
a movable frame;
a slide which is movable on the frame in a vertical direction;
a spindle drive for driving the slide;
a container pivoting device mounted on the slide, the container pivoting device includes multiple latches that grip a container located on a container stack from above; and
a locking element mounted on the container pivoting device such that the locking element is movable and which:
in a first setting, enables overtaking of the slide by an output element of the spindle drive and at a same time blocks pivoting movements of the container pivoting device, and
in a second setting, blocks overtaking of the slide by the output element of the spindle drive and, at a same time, enables pivoting movements of the container pivoting device, and
a switchover between the first and second settings of the locking element is provided in a mechanically positively controlled manner as a function of the vertical position of the slide.

9. The lifting and emptying device according to claim 8, further comprising a brake designed to stop the slide in a mechanically controlled manner in an event of a removal of the output element of the spindle drive from the slide.

10. A container lifting and emptying device, comprising:
a vertical guide;
a slide mounted on the guide for movement in a vertical direction;
a drive connected to the slide for moving the slide on the vertical guide;
a pivot arm connected to the slide;
a holding frame extending from the pivot arm, the holding frame at least partially encompassing a container receiving space; and

at least one latch located on each of two opposing sides of the holding frame, the at least one latch on each of the two opposing sides being configured to grip a container located on a container stack from above, wherein the latches are provided for different container types, and all of the latches are preloaded by spring force and are deactivatable by latching bolts.

11. The lifting and emptying device according to claim 10, wherein at least two of the latches are arranged on opposite container sides in each case, said latches are designed for automatic engagement in a contour of the container upon lowering of the container pivoting device.

12. The lifting and emptying device according to claim 10, wherein the latches in an engaged state are designed to allow displacement of the container held by the latches in a plane parallel to a container bottom.

13. The lifting and emptying device according to claim 10, wherein the container pivoting device comprises a container cover lock, by which, in a mechanically positively controlled manner, an unlocking state is set in a storage position as well as in a tilted container position and a locking state is set in other positions.

14. The lifting and emptying device according to claim 10, further comprising a locking element mounted on the container pivoting device such that the locking element is movable and which, in a first setting, enables overtaking of the slide by an output element of the drive and at a same time blocks pivoting movements of the container pivoting device, and in a second setting, blocks overtaking of the slide by the output element of the drive and, at a same time, enables pivoting movements of the container pivoting device, and a switchover between the first and second settings of the locking element is provided in a mechanically positively controlled manner as a function of the vertical position of the slide.

15. The lifting and emptying device according to claim 14, further comprising a brake designed to stop the slide in a mechanically controlled manner in an event of a removal of the output element of the drive from the slide.

16. The lifting and emptying device according to claim 10, wherein the drive comprises an electrically operated traction drive, and a device for monitoring the electrically operated traction drive for tension is coupled to the electrically operated traction drive.

17. The lifting and emptying device according to claim 10, further comprising a movable frame on which the vertical guide is supported, and the movable frame is positionable around two container stacks positioned next to one another.

* * * * *